US012648506B2

(12) United States Patent　　　　　　(10) Patent No.:　US 12,648,506 B2
Cozza et al.　　　　　　　　　　　　　　(45) Date of Patent:　　　Jun. 9, 2026

(54) SYSTEM AND METHOD FOR DETECTING DISK PLUGGING ON A TILLAGE IMPLEMENT

(71) Applicant: CNH Industrial America LLC, New Holland, PA (US)

(72) Inventors: Michael R. Cozza, Pittsburgh, PA (US); Scott Glovier, McMurray, PA (US)

(73) Assignee: CNH Industrial America LLC, New Holland, PA (US)

( * ) Notice: Subject to any disclaimer, the term of this patent is extended or adjusted under 35 U.S.C. 154(b) by 369 days.

(21) Appl. No.: 18/394,739

(22) Filed: Dec. 22, 2023

(65) Prior Publication Data

US 2025/0204301 A1　　　Jun. 26, 2025

(51) Int. Cl.
　A01B 79/00　　　　(2006.01)
　A01B 63/00　　　　(2006.01)
　*A01B 49/02*　　　　(2006.01)

(52) U.S. Cl.
　CPC .......... A01B 79/005 (2013.01); A01B 63/002 (2013.01); *A01B 49/02* (2013.01)

(58) Field of Classification Search
　CPC ....... A01B 79/005; A01B 79/00; A01B 49/02; A01B 63/002
　See application file for complete search history.

(56) References Cited

U.S. PATENT DOCUMENTS

| | | | | |
|---|---|---|---|---|
| 6,092,609 | A * | 7/2000 | Jeffery | A01C 5/062 172/776 |
| 10,481,142 | B2 | 11/2019 | Rhodes et al. | |
| 11,197,402 | B2 | 12/2021 | Smith | |
| 11,284,557 | B2 | 3/2022 | Schoeny et al. | |
| 2019/0141880 | A1* | 5/2019 | Zemenchik | A01C 5/064 172/1 |
| 2021/0029865 | A1 | 2/2021 | Smith et al. | |
| 2021/0045278 | A1* | 2/2021 | Henry | A01B 9/003 |
| 2021/0345536 | A1 | 11/2021 | Bich et al. | |
| 2022/0304213 | A1* | 9/2022 | Schroeder | A01B 23/046 |
| 2022/0308254 | A1 | 9/2022 | Schroeder | |
| 2022/0400600 | A1* | 12/2022 | Mollick | A01B 59/004 |
| 2023/0172092 | A1* | 6/2023 | Sloneker | A01B 79/005 73/784 |
| 2024/0268251 | A1* | 8/2024 | Glovier | G01C 9/02 |
| 2025/0048956 | A1* | 2/2025 | Freire | A01C 11/006 |
| 2025/0204301 | A1* | 6/2025 | Cozza | G01L 1/22 |

* cited by examiner

*Primary Examiner* — Jamie L Mcgowan
(74) *Attorney, Agent, or Firm* — Dority & Manning, P.A.

(57)　　　　　　ABSTRACT
A system for detecting disk plugging on a tillage implement includes a main implement frame and a disk frame supported by the main implement frame. Furthermore, the system includes a plurality of disks supported by the disk frame. Each disk is configured to rotate relative to the soil of the field. Additionally, the system includes a load sensor configured to generate data indicative of a draft load being applied to the disk frame by the plurality of disks as the implement traverses the field. Moreover, the system includes a computing system communicatively coupled to the load sensor and configured to determine a twisting parameter of the disk frame about the main implement frame based on the data generated by the load sensor. Additionally, the computing system is configured to determine when one or more disks are plugged based on the determined twisting parameter.

19 Claims, 7 Drawing Sheets

300

402 — Receive load sensor data indicative of draft load being applied to disk frame by disks 404 — Determine twisting parameter of disk frame about main implement frame based on received load sensor data 406 — Determine when at least one disk is plugged based on determined twisting parameter 408 — Initiate control action associated with de-plugging the at least one disk

400

SYSTEM AND METHOD FOR DETECTING DISK PLUGGING ON A TILLAGE IMPLEMENT

FIELD OF THE INVENTION

The present disclosure generally relates to tillage implements and, more particularly, to systems and methods for detecting disk plugging on a tillage implement.

BACKGROUND OF THE INVENTION

It is well known that, to attain the best agricultural performance from a field, a farmer must cultivate the soil, typically through a tillage operation. Modern farmers perform tillage operations by pulling a tillage implement behind an agricultural work vehicle, such as a tractor. In certain configurations, tillage implements include one or more disks spaced apart disks supported on its frame, such as by one or more disk gangs. Each disk, in turn, is configured to rotate relative to the soil as the tillage implement travels across the field. The rotation of the disks loosens and/or otherwise agitates the soil to prepare the field for subsequent planting operations.

During tillage operations, field materials, such as residue, soil, rocks, and/or the like, may become trapped or otherwise accumulate between a disk and another component of the tillage implement, such as a scraper, an adjacent disk, C-hanger, and/or the like. When such accumulations of field materials become sufficient to prevent one or more disks from providing adequate tillage to the field (e.g., by slowing or preventing rotation of the disk(s)), the respective disk(s) is plugged. In such instances, it is necessary for the operator to take certain corrective actions to remove the accumulated field materials. However, it may be difficult for the tillage implement operator to determine when the disk(s) is plugged. In this respect, systems have been developed to detect plugging of disk(s) during tillage operations. While such systems work well, further improvements are needed.

Accordingly, an improved system and method for detecting disk plugging on a tillage implement would be welcomed in the technology.

SUMMARY OF THE INVENTION

Aspects and advantages of the technology will be set forth in part in the following description, or may be obvious from the description, or may be learned through practice of the technology.

In one aspect, the present subject matter is directed to a tillage implement. The tillage implement includes a main implement frame and a disk frame supported by the main implement frame. Additionally, the tillage implement includes a plurality of ground-engaging shanks supported on the main implement frame and configured to till soil as the tillage implement traverses a field. Furthermore, the tillage implement includes a plurality of disks supported by the disk frame. Each disk is configured to rotate relative to the soil of the field. Moreover, the tillage implement includes a load sensor configured to generate data indicative of a draft load being applied to the disk frame by the plurality of disks as the tillage implement traverses the field. Additionally, the tillage implement includes a computing system communicatively coupled to the load sensor. The computing system is configured to determine a twisting parameter of the disk frame about the main implement frame based on the data generated by the load sensor. Moreover, the computing system is configured to determine when at least one disk of the plurality of disks is plugged based on the determined twisting parameter.

In another aspect, the present subject matter is directed to a system for detecting disk plugging on a tillage implement. The system includes a main implement frame and a disk frame supported by the main implement frame. Additionally, the system includes a plurality of disks supported by the disk frame. Each disk is configured to rotate relative to soil of a field. Furthermore, the system includes a load sensor configured to generate data indicative of a draft load being applied to the disk frame by the plurality of disks as the tillage implement traverses the field. Moreover, the system includes a computing system communicatively coupled to the load sensor. The computing system is configured to determine a twisting parameter of the disk frame about the main implement frame based on the data generated by the load sensor. Additionally, the computing system is configured to determine when at least one disk of the plurality of disks is plugged based on the determined twisting parameter.

In a further aspect, the present subject matter is directed to a method for detecting disk plugging on a tillage implement. The tillage implement includes a main implement frame and a disk frame supported by the main implement frame at a plurality of coupling joints. The method includes receiving, with a computing system, load sensor data from a load sensor indicative of a draft load being applied to the disk frame by a plurality of disks supported by the disk frame as the tillage implement traverses a field. Moreover, the method includes determining, with the computing system, a twisting parameter of the disk frame about the main implement frame based on the received load sensor data. Additionally, the method includes determining, with the computing system, when at least one disk of the plurality of disks is plugged based on the determined twisting parameter. Furthermore, the method includes initiating, with the computing system, a control action associated with de-plugging the at least one disk of the plurality of disks when it is determined that the at least one disk of the plurality of disks is plugged.

These and other features, aspects and advantages of the present technology will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present technology, including the best mode thereof, directed to one of ordinary skill in the art, is set forth in the specification, which makes reference to the appended figures, in which.

Figure 1:
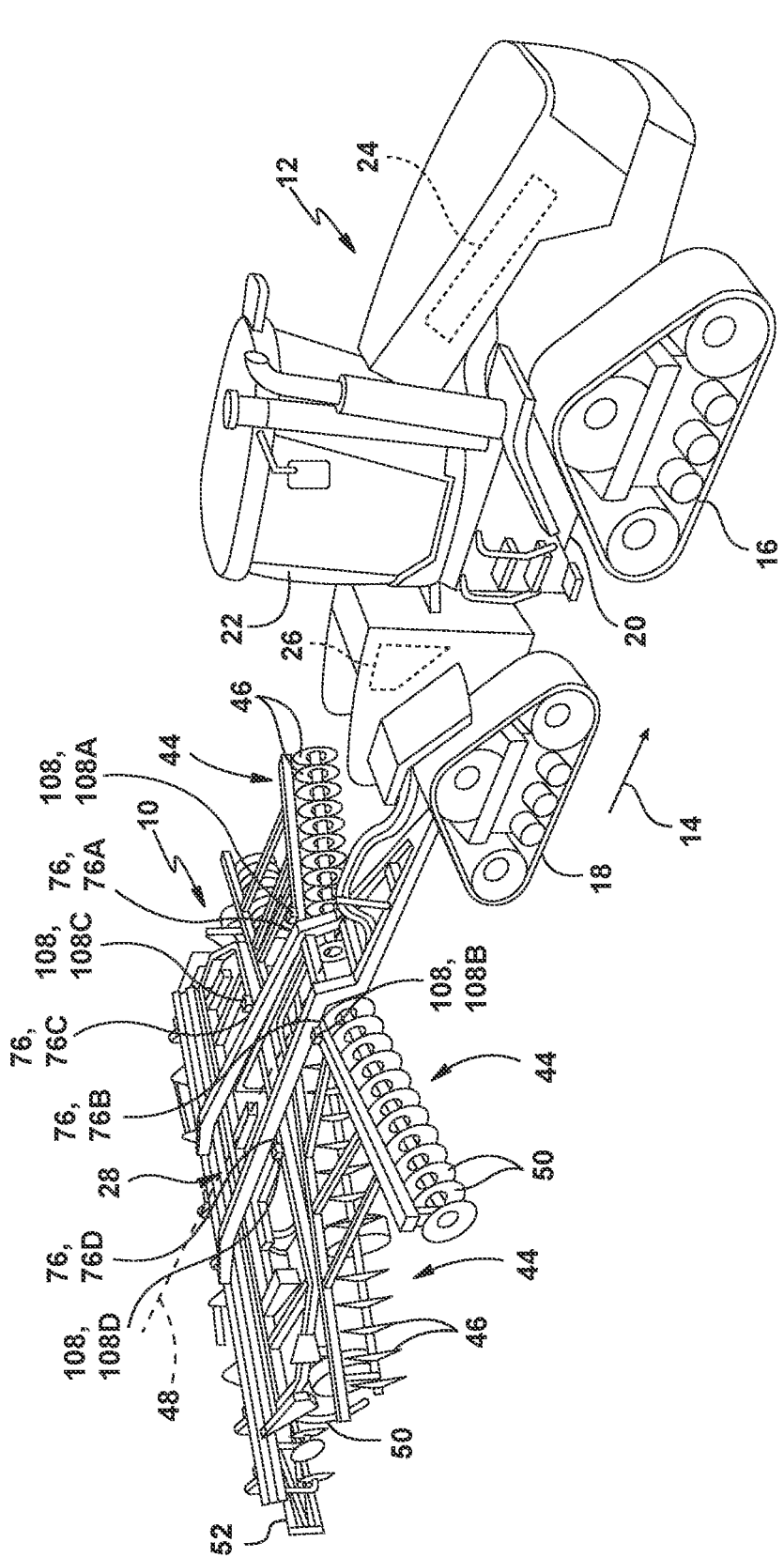
FIG. 1 illustrates a perspective view of one embodiment of a tillage implement coupled to a work vehicle in accordance with aspects of the present subject matter.

Repeat use of reference characters in the present specification and drawings is intended to represent the same or analogous features or elements of the present technology.

DETAILED DESCRIPTION OF THE DRAWINGS

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to a system and method for detecting disk plugging on a tillage implement. As will be described below, the tillage implement generally includes a main implement frame and a disk frame supported by the main implement frame. Additionally, the tillage implement includes one or more disks supported by the frame, such as, for example, via one or more disk gangs. In this respect, as the tillage implement travels across the field to perform a tillage operation thereon, the disks rotate relative to the field such that field materials (e.g., soil, residue, rocks, etc.) flow between the disks. However, when a sufficient amount of field materials accumulates between the one or more of the disks and another component of the tillage implement, such as a scraper, an adjacent disk, C-hanger, and/or the like, the operation of the disk(s) may be impacted. In such instances, the disk(s) is considered plugged.

In several embodiments, a computing system of the disclosed system is configured to determine when one or more disks of the implement are plugged. More specifically, the computing system receives load sensor data from one or more load sensors indicative of the draft load(s) being applied to the disk frame by the plurality of disks as the tillage implement traverses the field. Furthermore, the computing system determines the twisting parameter(s) (e.g., moment(s)/torque(s)) of the disk frame about the main implement frame, such as about a longitudinal centerline of the main implement frame, based on the received load sensor data. In some embodiments, the computing system determines the distance(s) between the centerline of the disk frame and the load sensor(s) and then determines the twisting parameter(s) based on the received load sensor data and the determined distance(s). Additionally, the computing system determines when one or more disks are plugged based on the determined twisting parameter(s). Thereafter, the computing system may initiate a control action(s) associated with de-plugging the disk(s) when determined that one or more disks are plugged. Such control action(s) may include providing a notification to the operator, adjusting the ground speed of the tillage implement, adjusting the positions of the disk(s) relative to the main implement frame, and/or the like.

Using the twisting parameter(s) of the disk frame about the main implement frame to determine when the disks are plugged improves the operation of the tillage implement. More specifically, when one or more disks become plugged, the field materials apply draft load(s) to the disk(s), typically draft loads, which, in turn, causes the disk(s) to apply unevenly distributed draft load(s) to the disk frame. Such unevenly distributed draft load(s) results in one or more twisting parameters (e.g., moment(s)/torque(s)) of the disk frame about the main implement frame. As such, the likelihood of one or more disks being plugged increases as the twisting parameter(s) being applied to a disk gang increases. As described above, the disclosed system and method determine when one or more disks of the implement are plugged based on determined the twisting parameter(s) of the disk frame about the main implement frame and, thus, provide for more accurate detection of plugging.

Figure 2:
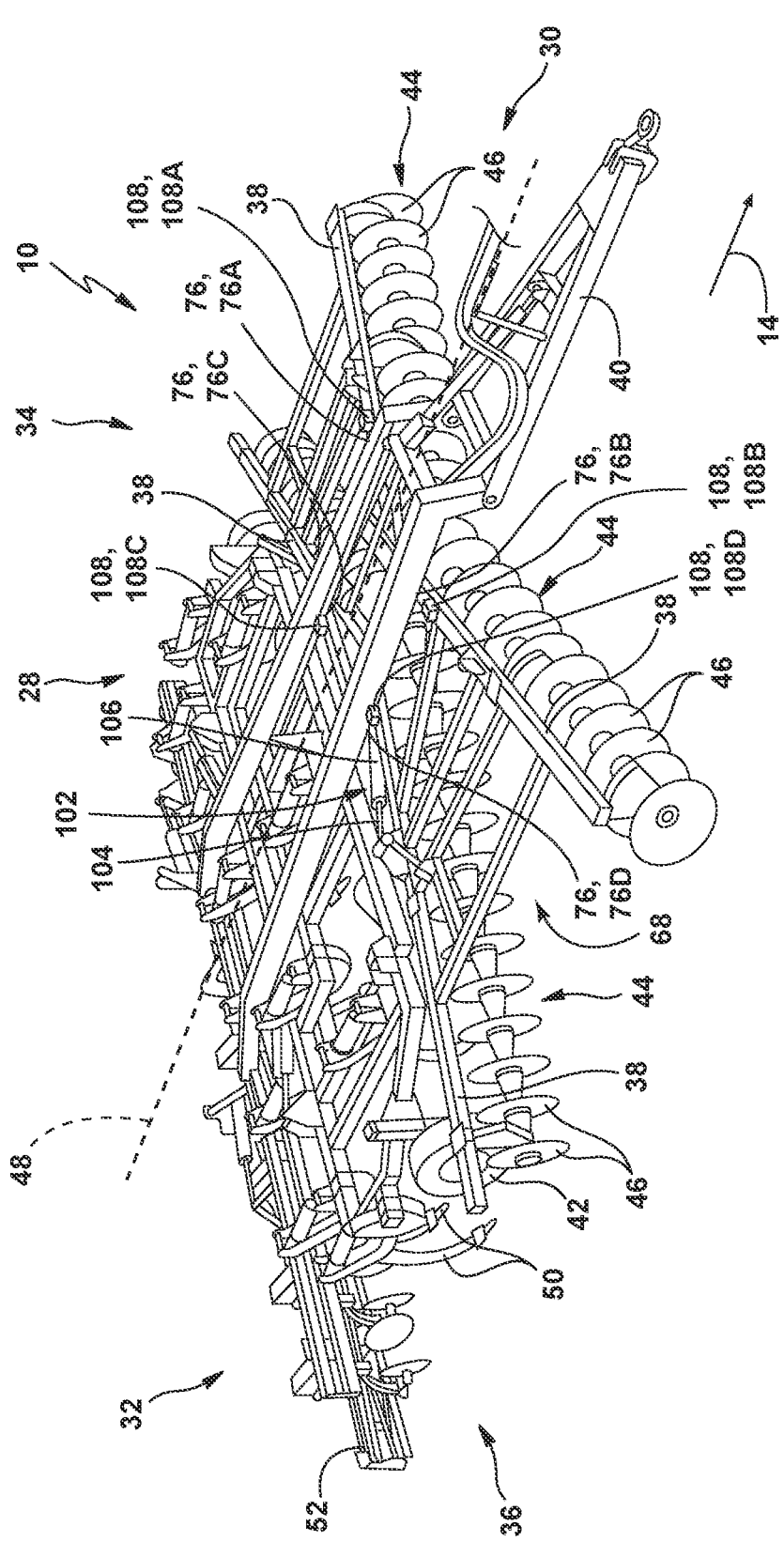
FIG. 2 illustrates an alternative perspective view of the tillage implement shown in FIG. 1, particularly illustrating various components of the tillage implement.

Referring now to the drawings, FIGS. 1 and 2 illustrate differing perspective views of one embodiment of a tillage implement 10 in accordance with aspects of the present subject matter. Specifically, FIG. 1 illustrates a perspective view of the tillage implement 10 coupled to a work vehicle 12. Additionally, FIG. 2 illustrates a perspective view of the implement 10, particularly illustrating various components of the implement 10.

In general, the implement 10 may be configured to be towed across a field in a direction of travel (e.g., as indicated by arrow 14 in FIG. 1) by the work vehicle 12. As shown, the implement 10 is configured as a disk ripper, and the work vehicle 12 is configured as an agricultural tractor. However, in other embodiments, the implement 10 may be configured as any other suitable type of tillage implement. Similarly, the work vehicle 12 may be configured as any other suitable type of vehicle.

As shown in FIG. 1, the work vehicle 12 may include a pair of front track assemblies 16, a pair or rear track assemblies 18, and a frame or chassis 20 coupled to and supported by the track assemblies 16, 18. An operator's cab 22 may be supported by a portion of the chassis 20 and may house various input devices (e.g., a user interface 220 shown in FIG. 4) for permitting an operator to control the operation of one or more components of the work vehicle 12 and/or one or more components of the implement 10. Additionally, the work vehicle 12 may include an engine 24 and a transmission 26 mounted on the chassis 20. The transmission 26 may be operably coupled to the engine 24 and may provide variably adjusted gear ratios for transferring engine power to the track assemblies 16, 18 via a drive axle assembly (not shown) (or via axles if multiple drive axles are employed).

As shown in FIGS. 1 and 2, the implement 10 may include a main implement frame 28. More specifically, the main implement frame 28 may extend longitudinally between a forward end 30 and an aft end 32. The main implement frame 28 may also extend laterally between a first side 34 and a second side 36. Furthermore, the main implement frame 28 may define a longitudinal centerline 48 extending parallel to the direction of travel 14. Moreover, the main implement frame 28 generally supports one or more subframes, such as a disk frame 68, at one or more coupling joints 76 at which the disk frame 68 or other subframe(s) is coupled to the main implement frame 28. For example, the main implement frame 28 may support the disk frame 68 at first, second, third, and fourth coupling joints 76A, 76B, 76C, 76D. The disk frame 68 and/or other subframe(s) may be coupled to the main implement frame 28 at the coupling joint(s) 76 via one or more fasteners, such as U-bolts, axial bolts, and/or the like. However, it should be appreciated that the disk frame 68 and/or the other subframe(s) may be coupled to the main implement frame 28 in any suitable manner.

Additionally, the disk frame 68 includes a plurality of structural frame members 38, such as beams, bars, support arms, and/or the like, configured to support or couple to a plurality of components. Furthermore, a hitch assembly 40 may be connected to the main implement frame 28 and configured to couple the implement 10 to the work vehicle 12. Additionally, a plurality of wheels 42 (one is shown) may be coupled to the main implement frame 28 to facilitate towing the implement 10 in the direction of travel 14.

In several embodiments, the disk frame 68 may be configured to support a plurality of disks 46. For example, in the embodiments shown in FIGS. 1 and 2, the disk frame 68 may be configured to support one or more gangs or sets 44 of the disks 46. Each disk 46 may, in turn, be configured to penetrate into or otherwise engage the soil as the implement 10 is being pulled through the field. In this regard, the disk gang(s) 44 may be oriented at an angle relative to the direction of travel 14 to promote more effective tilling of the soil. In the embodiment shown in FIGS. 1 and 2, the implement 10 includes first, second, third, and fourth disk gangs 44A, 44B, 44C, 44D supported on the disk frame 68 adjacent to the forward end 30 of the main implement frame 28. However, in alternative embodiments, the implement 10 may include any other suitable number of disk gangs 44, such as more or fewer than four disk gangs 44. Furthermore, in one embodiment, the disk gangs 44 may be mounted to the disk frame 68 at any other suitable location, such as adjacent to the aft end 32 of the main implement frame 28. Additionally, it should be appreciated that the disk frame 68 may be configured to support the plurality of disks 46 in any other suitable manner. For example, each disk 46 may be individually coupled to the disk frame 68, such as to one of the structural frame members 38, via, for example, one or more fasteners, brackets, and/or the like.

Moreover, in several embodiments, the implement 10 may include a plurality of actuators 102 (one is shown). In general, each actuator 102 is configured to move or otherwise adjust the orientation or position of one or more of the disks 46. For example, in the embodiment shown in FIGS. 1 and 2, the actuators 102 are configured as disk gang actuators configured to move or otherwise adjust the orientation or position of one of the disk gangs 44 relative to the main implement frame 28. In this respect, a first end of each actuator 102 (e.g., a rod 104 of the actuator 102) is be coupled to one of the structural frame members 38 of the disk frame 68 associated with disk gang 44, while a second end of each actuator 102 (e.g., the cylinder 106 of the actuator 102) is coupled to the main implement frame 28. The rod 104 of each actuator 102 may be configured to extend and/or retract relative to the corresponding cylinder 106 to adjust the angle of the corresponding disk gang 44 relative to a lateral centerline (not shown) of the main implement frame 28 and/or the penetration depth of the associated disks 46. In the illustrated embodiment, each actuator 102 corresponds to a fluid-driven actuator, such as a hydraulic or pneumatic cylinder. However, each actuator 102 may correspond to any other suitable type of actuator, such as an electric linear actuator.

Additionally, as shown, in one embodiment, the implement main implement frame 28 may be configured to support ground engaging tools. For instance, in the illustrated embodiment, the main implement frame 28 supports a plurality of ground-engaging shanks 50 configured to rip or otherwise till the soil as the implement 10 is towed across the field. Furthermore, in the illustrated embodiment, the main implement frame 28 also supports a plurality of rolling (or crumbler) basket assemblies 52. However, in other embodiments, any other suitable ground-engaging tools may be coupled to and supported by the implement main implement frame 28.

The configuration of the tillage implement 10 and the work vehicle 12 described above and shown in FIGS. 1 and 2 is provided only to place the present subject matter in an exemplary field of use. Thus, the present subject matter may be readily adaptable to any manner of implement and/or vehicle configuration.

Furthermore, one or more load sensors 108 may be positioned on the implement 10, such as between the disk frame 68 and the main implement frame 28. In general, the load sensor(s) 108 is configured to generate data indicative of one or more draft loads being applied to the disk frame 68 by the plurality of disks 46 as the tillage implement 10 traverses the field during a tillage operation. Such draft load(s) results from engagement between the disks 46 and the soil into which the disks 46 have penetrated. As will be described below, the data generated by the load sensor(s) 108 is, in turn, subsequently used to determine one or more twisting parameters (e.g., moment(s)/torque(s)) of the disk frame 68 about the main implement frame 28.

In general, the load sensor(s) 108 may correspond to any suitable sensing device(s) configured to generate data indicative of the draft load(s) being applied to the disk frame 68 by the plurality of disks 46. For example, in one embodiment, the load sensor(s) 108 may correspond to a strain gauge(s). However, in alternative embodiments, the load sensor(s) 108 may correspond to any other suitable sensing device(s) such as a load cell(s) and/or the like.

Furthermore, the any number of load sensors 108 may be positioned on the implement 10 and configured to generate data indicative of the draft load(s) being applied to the disk frame 68 by the plurality of disks 46. For example, in the embodiment shown in FIGS. 1 and 2, first, second, third, and fourth load sensors 108A, 108B, 108C, 108D are positioned at the first, second, third, and fourth coupling joints 76A, 76B, 76C, 76D respectively and each configured to generate data indicative of the draft load(s) being applied to the disk frame 68 at the respective coupling joint 76.

Figure 3:
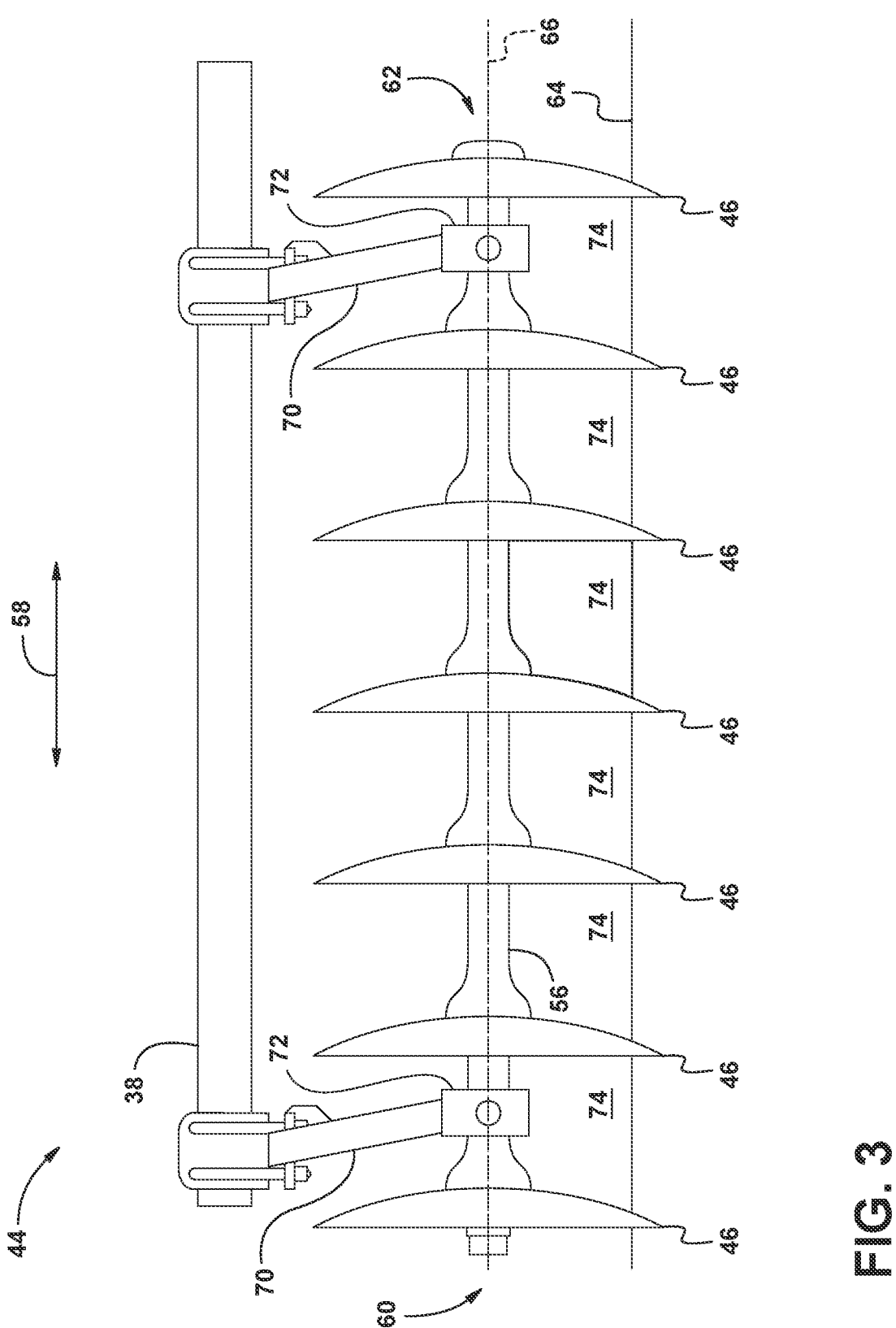
FIG. 3 illustrates a front view of one embodiment of a plurality of disks of a tillage implement supported on a disk gang in accordance with aspects of the present subject matter.

Referring now to FIG. 3, a front view of one embodiment of a plurality of disks 46 of the implement 10 supported on a disk gang 44 is illustrated in accordance with aspects of the present subject matter. Specifically, in several embodiments, the disk gang 44 may include a disk gang shaft 56 that extends along an axial direction or length of the disk gang 44 (e.g., as indicated by arrow 58 in FIG. 3) between a first end 60 and a second end 62. As shown, the disks 46 are coupled to the disk gang shaft 56 and spaced apart from each other along the axial direction 58. As the implement 10 is moved across a field, the disks 46 may be configured to penetrate the soil surface (e.g., as indicated by line 64 in FIG. 3) of the field and rotate about an axis of rotation (e.g., as indicated by dashed line 66 in FIG. 3) relative to the soil within the field.

In general, the disk gang 44 is supported relative to the corresponding structural frame member 38 of the disk frame 68 of the tillage implement 10. Specifically, in several embodiments, a pair of hangers 70 (e.g., C-hangers) support the disk gang 44 at a position below the corresponding structural frame member 38. For example, in one embodiment, one end of each hanger 70 may be coupled to the corresponding structural frame member 38, while the opposing end of each hanger 70 is coupled to a bearing block 72. The bearing blocks 72, in turn, are rotatably coupled to the disk gang shaft 56. However, in alternative embodiments, the disk gang 44 may have any other suitable configuration.

As shown in FIG. 3, a plurality of flow zones 74 through which field materials may flow during the operation of the implement 10 may be defined by the disks 46. Specifically, in several embodiments, each flow zone 74 may be defined directly between a pair of adjacent disks 46 in the axial direction 58. However, in alternative embodiments, each flow zone 74 may be defined between a single disk 46 and another component of the implement 10, such as a scraper, a C-hanger, and/or the like. In this respect, as the implement 10 travels across the field, field materials (e.g., soil, residue, rocks, and/or the like) may flow through the flow zone 74 as such field materials are being tilled or otherwise processed by the disks 46. During normal, non-plugged operation of the disk gang 44, substantially all of the field materials being processed by the disk gang 44 flow through the flow zones 74, with only minimal field materials likely becoming trapped or otherwise accumulating within the flow zones 74. However, when a sufficient amount of field materials accumulates with one or more of the flow zones 74 such that rotation of the disks 46 is impacted (e.g., the rotational speed of the disks 46 is reduced or the disks 46 stop rotating), the disk gang 44 is considered plugged. The draft load(s) applied to the disks 46 because of the plugging, in turn, is applied by the disks 46 on the corresponding structural member 38 of the disk frame 68, which causes the disk frame 68 to twist relative to the main implement frame 28 (FIGS. 1, 2). For example, the draft load(s) applied by the disks 46 to the corresponding structural member 38 may create a moment/torque of the disk frame 68 about the longitudinal centerline 48 (FIGS. 1, 2) of the main implement frame 28.

The configuration of the tillage implement 10 described above and shown in FIG. 3 is provided only to place the present subject matter in an exemplary field of use. Thus, the present subject matter may be readily adaptable to any manner of implement configuration.

Figure 4:
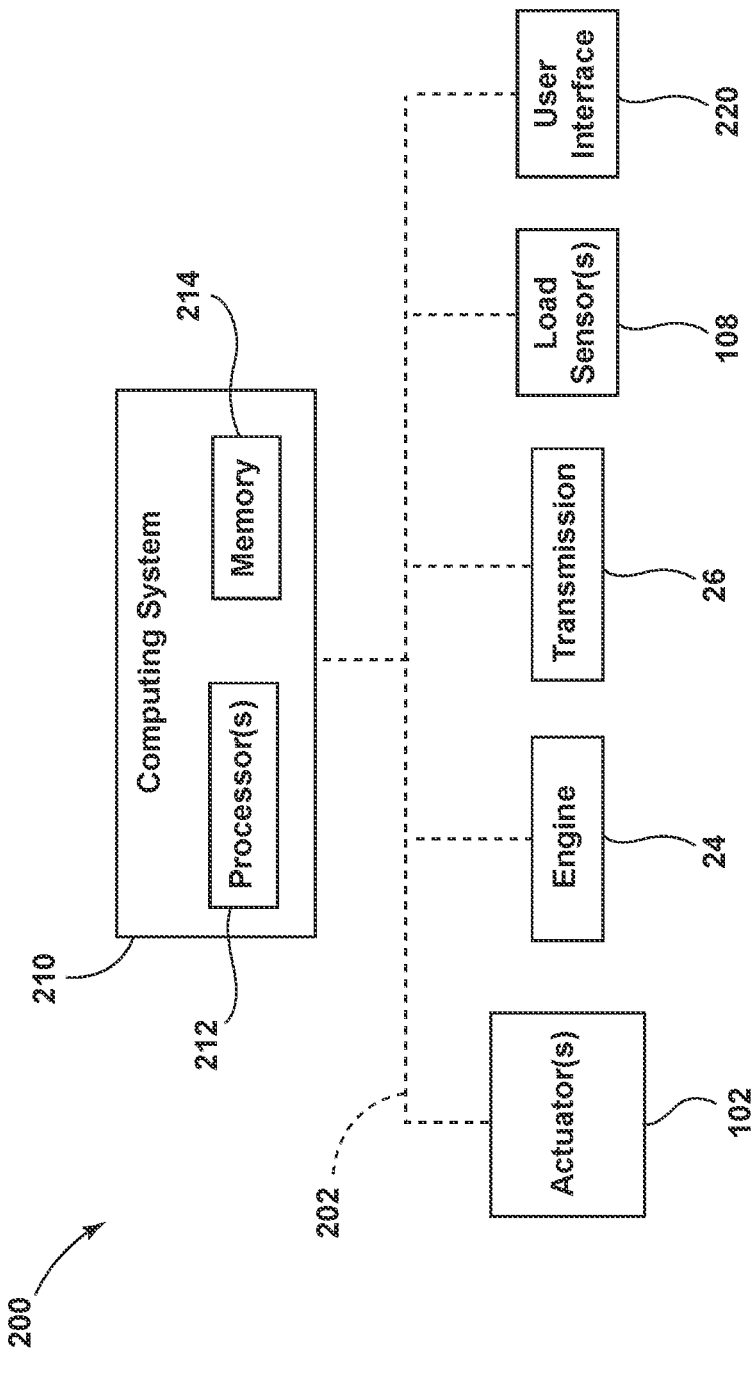
FIG. 4 illustrates a schematic view of one embodiment of a system for detecting disk plugging on a tillage implement in accordance with aspects of the present subject matter.

Referring now to FIG. 4, a schematic view of one embodiment of a system 200 for detecting disk plugging on a tillage implement is illustrated in accordance with aspects of the present subject matter. In general, the system 200 will be described herein with reference to the tillage implement 10 and the work vehicle 12 described above with reference to FIGS. 1-3. However, the disclosed system 200 may generally be utilized with tillage implements having any other suitable implement configuration and/or with work vehicles having any other suitable vehicle configuration.

As shown in FIG. 4, the system 200 generally includes one or more components of the tillage implement 10 and/or the work vehicle 12. For example, in the illustrated embodiment, the system 200 includes the engine 24 and the transmission 26 of the work vehicle 12 and the actuators 102 and the load sensors 108 of the tillage implement 10.

Moreover, the system 200 includes a computing system 210 communicatively coupled to one or more components of the tillage implement 10, the work vehicle 12, and/or the system 200 to allow the operation of such components to be electronically or automatically controlled by the computing system 210. For instance, the computing system 210 may be communicatively coupled to the load sensor(s) 108, such as the first, second, third, and fourth load sensors 108A, 108B,

108C, 108D, via a communicative link 202. As such, the computing system 210 may be configured to receive data from the load sensor(s) 108. Furthermore, the computing system 210 may be communicatively coupled to the engine 24, the transmission 26, and/or the actuators 102 via the communicative link 202. In this respect, the computing system 210 may be configured to control the operation of the components 24, 26, 102. In addition, the computing system 210 may be communicatively coupled to any other suitable components of the implement 10, the vehicle 12, and/or the system 200.

In general, the computing system 210 may comprise any suitable processor-based device known in the art, such as a given controller or computing device or any suitable combination of controllers or computing devices. Thus, in several embodiments, the computing system 210 may include one or more processor(s) 212 and associated memory device(s) 214 configured to perform a variety of computer-implemented functions. As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) 214 of the computing system 210 may generally comprise memory element(s) including, but not limited to, a computer readable medium (e.g., random access memory (RAM)), a computer readable non-volatile medium (e.g., a flash memory), a floppy disc, a compact disc-read only memory (CD-ROM), a magneto-optical disc (MOD), a digital versatile disc (DVD), and/or other suitable memory elements. Such memory device(s) 214 may generally be configured to store suitable computer-readable instructions that, when implemented by the processor(s) 212, configure the computing system 210 to perform various computer-implemented functions, such as one or more aspects of the methods and algorithms that will be described herein. In addition, the computing system 210 may also include various other suitable components, such as a communications circuit or module, one or more input/output channels, a data/control bus and/or the like.

It should be appreciated that the computing system 210 may correspond to an existing computing system(s) of the implement 10, itself, or the computing system 210 may correspond to a separate processing device. For instance, in one embodiment, the computing system 210 may form all or part of a separate plug-in module that may be installed in association with the implement 10 to allow for the disclosed systems to be implemented without requiring additional software to be uploaded onto existing control devices of the implement 10.

Furthermore, it should also be appreciated that the functions of the computing system 210 may be performed by a single processor-based device or may be distributed across any number of processor-based devices, in which instance such devices may be considered to form part of the computing system 210. For instance, the functions of the computing system 210 may be distributed across multiple application-specific controllers or computing devices, such as a navigation controller, an engine computing controller, a transmission controller, an implement controller and/or the like.

In addition, the system 200 may also include a user interface 220. More specifically, the user interface 220 may be configured to provide feedback from the computing system 210 (e.g., feedback associated with plugging of one or more of the disks 46) to the operator. As such, the user interface 220 may include one or more feedback devices (not shown), such as display screens, speakers, warning lights, and/or the like, which are configured to provide feedback from the computing system 210 to the operator. As such, the user interface 220 may, in turn, be communicatively coupled to the computing system 210 via the communicative link 202 to permit the feedback to be transmitted from the computing system 210 to the user interface 220. Furthermore, some embodiments of the user interface 220 may include one or more input devices, such as touchscreens, keypads, touchpads, knobs, buttons, sliders, switches, mice, microphones, and/or the like, which are configured to receive inputs from the operator. In one embodiment, the user interface 220 may be mounted or otherwise positioned within the cab 22 of the work vehicle 12. However, in alternative embodiments, the user interface 220 may mounted at any other suitable location.

Figure 5:
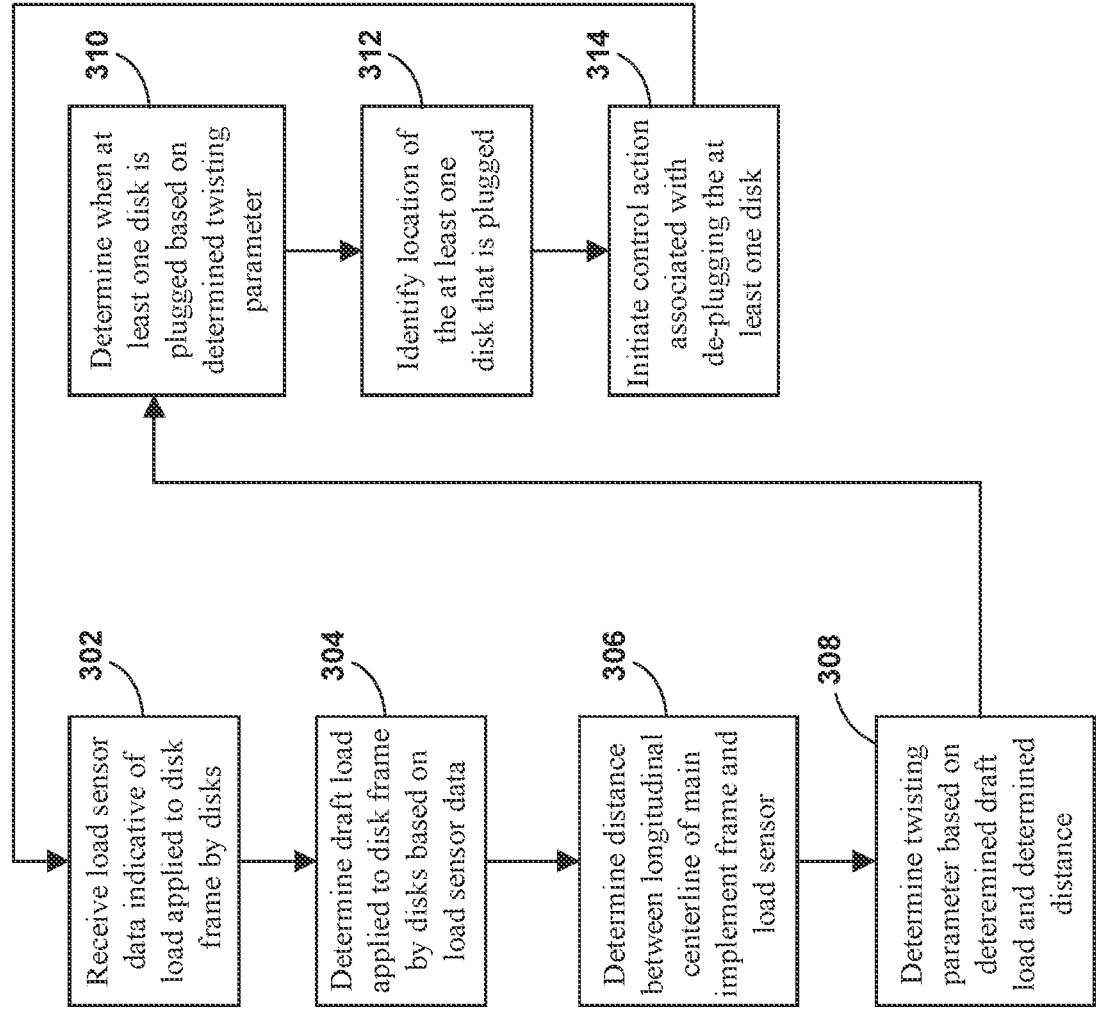
FIG. 5 illustrates a flow diagram providing one embodiment of control logic for detecting disk plugging on a tillage implement in accordance with aspects of the present subject matter.

Referring now to FIG. 5, a flow diagram of one embodiment of control logic 300 that may be executed by the computing system 210 (or any other suitable computing system) for detecting disk plugging on a tillage implement is illustrated in accordance with aspects of the present subject matter. Specifically, the control logic 300 shown in FIG. 5 is representative of steps of one embodiment of an algorithm that can be executed to detect disk plugging on the tillage implement 10 based on the twisting of the disk frame 68 relative to the main implement frame 28. Thus, in several embodiments, the control logic 300 may be advantageously utilized in association with a system installed on or forming part of an agricultural implement to allow for real-time detection of disk plugging on an agricultural implement without requiring substantial computing resources and/or processing time. However, in other embodiments, the control logic 300 may be used in association with any other suitable system, application, and/or the like for detecting disk plugging on an agricultural implement.

As shown in FIG. 5, at (302), the control logic 300 includes receiving load sensor data indicative of a draft load being applied to the disk frame by a plurality of disks supported on the disk frame as the tillage implement traverses a field. Specifically, as mentioned above, in several embodiments, the computing system 210 is communicatively coupled to the load sensor(s) 108 via the communicative link 202. In this respect, as the implement/vehicle 10/12 travels across the field to perform a tillage operation thereon, the computing system 210 may receive data from the load sensor(s) 108.

Figure 6:
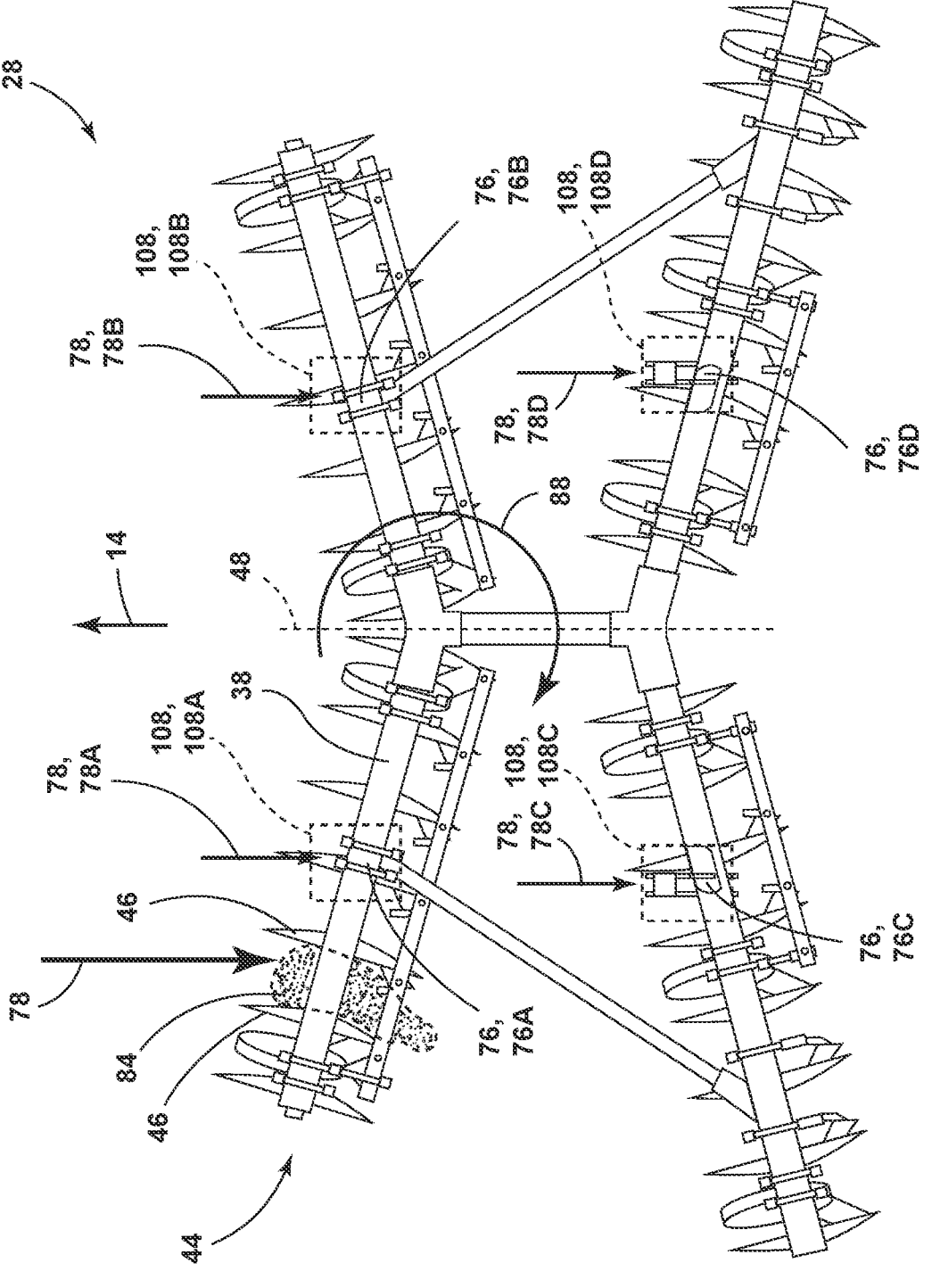
FIG. 6 illustrates a top view of the tillage implement shown in FIGS. 1 and 2, particularly illustrating various loads and moments acting on the tillage implement.

For example, the computing system 210 may be configured to receive load sensor data from the first, second, third, and fourth load sensors 108A, 108B, 108C, 108D, as shown in FIG. 6. Such data, in turn, may be indicative of first, second, third, and fourth draft loads (as indicated by arrows 78A, 78B, 78C, and 78D) being applied to the disk frame 68 at the first, second, third, and fourth coupling joints 76A, 76B, 76C, 76D respectively by the plurality of disks 46, such as due to the engagement between the disks 46 and the soil in the field. As shown in FIG. 6, such draft loads 78 may be caused by plugs 84 between pairs of adjacent disks 46. However, the plugs 84 may also occur between the disks 46 and another component of the implement 10, such as a scraper, C-hanger, and/or the like.

Furthermore, at (304), the control logic 300 includes determining the draft load being applied to the disk frame by the plurality of disks based on the received load sensor data. Specifically, in several embodiments, the computing system 210 is configured to determine the load(s) (e.g., a load value(s)) being applied to the disk frame 68 by the plurality of disks 46, such as the draft loads 78 shown in FIG. 6, based on the load sensor data received at (302). For example, in one embodiment, the computing system 210 may access a look-up table(s) stored within its memory device(s) 214 that correlates the load sensor data received at (302) to the load value(s).

Additionally, or alternatively, in several embodiments, the computing system 210 may be configured to determine the draft loads 78A, 78B, 78C, 78D being applied to the disk frame 68 by the plurality of disks 46 at each coupling joint 76A, 76B, 76C, 76D based on the load sensor data received from the load sensors 108A, 108B, 108C, 108D respectively.

Moreover, at (306), the control logic 300 includes determining a distance between the longitudinal centerline of the main implement frame and the load sensor. Specifically, in several embodiments, the computing system 210 may be configured to determine a distance 54, such the distance perpendicular to the direction of travel 14, between the longitudinal centerline 48 of the main implement frame 28 and the load sensor(s) 108.

For example, the computing system 210 may be configured to determine first, second, third, and fourth distances 54A, 54B, 54C, 54D (FIG. 6) perpendicular to the direction of travel 14 between the longitudinal centerline 48 and the first, second, third, and fourth load sensors 108A, 108B, 108C, 108D (FIG. 6) respectively.

Furthermore, at (308), the control logic 300 includes determining a twisting parameter of the disk frame about the main implement frame based on the determined draft load being applied to the disk frame and the determined distance. Specifically, in several embodiments, the computing system 210 is configured to determine one or more twisting parameters of the disk frame 68 about the main implement frame 28 based on the draft load(s) 78 being applied to the disk frame 68 determined at (304) and the distance between the longitudinal centerline 48 of the main implement frame 28 and the load sensor(s) 108 determined at (306).

For example, in one embodiment, the computing system 210 may be configured to determine a moment/torque (as indicated by arrow 88 in FIG. 6) of the disk frame 68 about the longitudinal centerline 48 of the main implement frame 28 of the implement 10 based on the draft loads 78A, 78B, 78C, 78D (FIG. 6) and the respective distances 54A, 54B, 54C, 54D (FIG. 6). In this respect, the computing system 210 may be configured to determine the moment/torque 88 of the disk frame 68 about the longitudinal centerline 48 of the main implement frame 28 as the sum of the products of the distances 54A, 54B, 54C, 54D and the respective draft load(s) 78A, 78B, 78C, 78D. Such moment/torque of the disk frame 68 about the main implement frame 28 may be indicative of plugging of one or more of the disks 46.

Additionally, at (310), the control logic 300 includes determining when at least one disk of the plurality of disks is plugged based on the determined twisting parameter. Specifically, in several embodiments, the computing system 210 is configured to determine when one or more of the disks 46 are plugged based on the twisting parameter(s) determined at (308).

Moreover, at (312), after determining that the at least one disk of the plurality of disks is plugged, the control logic 300 includes identifying a location of the at least one disk that is plugged based on the data generated by the load sensor. Specifically, in several embodiments, after determining that one or more of the disks 46 are plugged, the computing system 210 is configured to identify the location(s) of the disk(s) 46 that is plugged based on the data generated by the load sensor(s) 108. For example, the computing system 210 may identify the location(s) (e.g., the disk gang(s) 44) of the disk(s) 46 that are plugged based on data values generated by each load sensor 108 that resulted in the determination that one or more of the disks 46 are plugged.

Additionally, as shown in FIG. 5, at (314), the control logic 300 includes initiating a control action associated with de-plugging the at least one disk of the plurality of disks when it is determined that the at least one disk of the plurality of disks is plugged. Specifically, in several embodiments, the computing system 210 is configured to initiate one or more control actions associated with one or more of the disks 46 of the tillage implement 10 being plugged. For example, in one embodiment, the control action(s) include providing a notification to the operator of the implement/vehicle 10/12 that the disk(s) 46 are plugged. In such an embodiment, the computing system 210 may transmit suitable control signals to the user interface 220 instructing the user interface 220 to provide the appropriate notification to the operator. Alternatively, or additionally, the control action(s) may include reducing or halting the ground speed of the implement/vehicle 10/12. In such an embodiment, the computing system 210 may transmit suitable control signals to the engine 24 and/or transmission 26 of the vehicle 12 instructing the engine 24 and/or transmission 26 to reduce or halt the ground speed of the implement/vehicle 10/12.

Additionally, or alternatively, the control action(s) may be associated with the location(s) of the disk(s) 46 that is plugged identified at (312). For example, in one embodiment, the control action(s) includes adjusting the position(s) of the disk gang(s) 44 that have the plugged disk(s) 46 relative to the main implement frame 28. In such an embodiment, the computing system 210 may transmit suitable control signals to the actuators 102 of the implement 10 instructing the actuators 102 to adjust the position of the given disk gang 44 relative to the main implement frame 28. However, in alternative embodiments, any other suitable control actions may be initiated at (314). Thereafter, the control logic 300 returns to (302).

Figure 7:
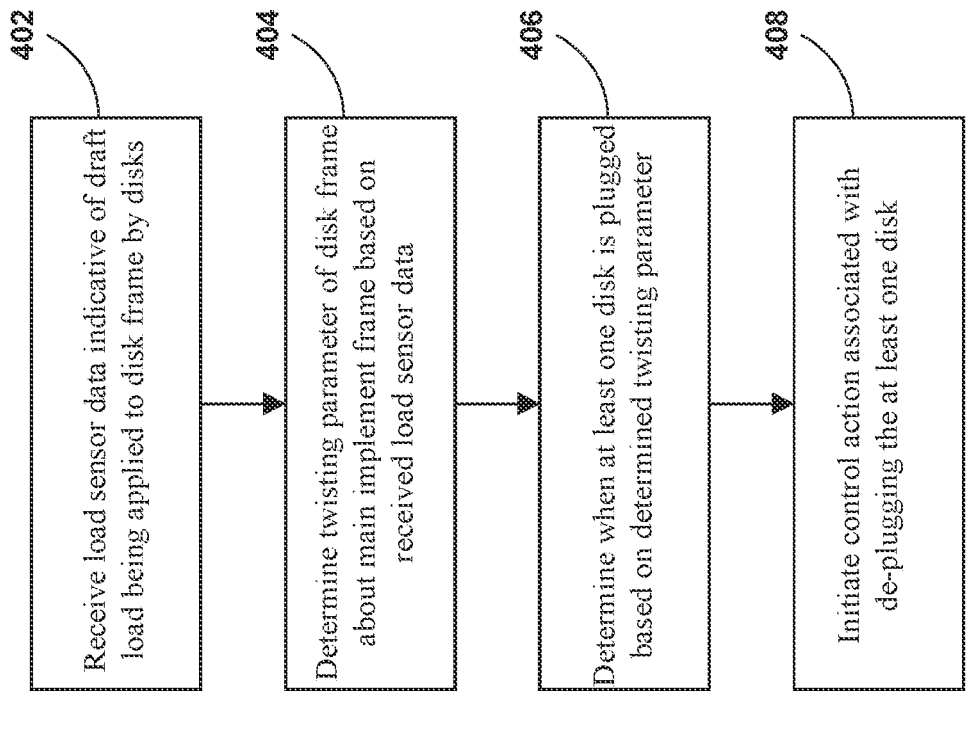
FIG. 7 illustrates a flow diagram of one embodiment of a method for detecting disk plugging on a tillage implement in accordance with aspects of the present subject matter.
Figure 7:
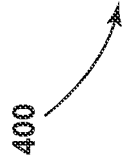

Referring now to FIG. 7, a flow diagram of one embodiment of a method 400 for detecting disk plugging on a tillage implement is illustrated in accordance with aspects of the present subject matter. In general, the method 400 will be described herein with reference to the tillage implement 10 and the system 200 described above with reference to FIGS. 1-6. However, it should be appreciated by those of ordinary skill in the art that the disclosed method 400 may generally be implemented with any tillage implements having any suitable implement configuration, work vehicles having any suitable vehicle configuration, and/or within any system having any suitable system configuration. In addition, although FIG. 7 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown in FIG. 7, at (402), the method 400 includes receiving, with a computing system, load sensor data from a load sensor indicative of a draft load being applied to the disk frame by a plurality of disks supported by the disk frame as the tillage implement traverses a field. For instance, as described above, the computing system 210 may be configured to receive load sensor data from the load sensor(s) 108. The received load sensor data is, in turn, indicative of the load(s) being applied to the disk frame 68 by the plurality of disks 46.

Additionally, at (404), the method 400 includes determining, with the computing system, a twisting parameter of the disk frame about the main implement frame based on the received load sensor data. For instance, as described above, the computing system 210 may be configured to determine the twisting parameter(s), such as the moment(s)/torque(s), of the disk frame 68 about the main implement frame 28 based on the received load sensor data.

Moreover, at (406), the method 400 includes determining, with the computing system, when at least one disk of the plurality of disks is plugged based on the determined twisting parameter. For instance, as described above, the computing system 210 may be configured to determine when one or more disks 46 are plugged based on the determined twisting parameter(s).

Furthermore, at (408), the method 400 includes initiating, with the computing system, a control action associated with de-plugging the at least one disk of the plurality of disks when it is determined that the at least one disk of the plurality of disks is plugged. For instance, as described above, the computing system 210 may be configured to initiate one or more control actions associated with de-plugging the disk(s) 46 when it is determined that the disk(s) 46 is plugged. Such control action(s) may include providing a notification to the operator of the implement/vehicle 10/12, adjusting the ground speed of the implement/vehicle 10/12, adjusting the position of the disk(s) 46 relative to the implement main implement frame 28, and/or the like.

It is to be understood that the steps of the control logic 300 and the method 400 are performed by the computing system 210 upon loading and executing software code or instructions which are tangibly stored on a tangible computer readable medium, such as on a magnetic medium, e.g., a computer hard drive, an optical medium, e.g., an optical disc, solid-state memory, e.g., flash memory, or other storage media known in the art. Thus, any of the functionality performed by the computing system 210 described herein, such as the control logic 300 and the method 400, is implemented in software code or instructions which are tangibly stored on a tangible computer readable medium. The computing system 210 loads the software code or instructions via a direct interface with the computer readable medium or via a wired and/or wireless network. Upon loading and executing such software code or instructions by the computing system 210, the computing system 210 may perform any of the functionality of the computing system 210 described herein, including any steps of the control logic 300 and the method 400 described herein.

The term "software code" or "code" used herein refers to any instructions or set of instructions that influence the operation of a computer or controller. They may exist in a computer-executable form, such as machine code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a controller.

This written description uses examples to disclose the technology, including the best mode, and also to enable any person skilled in the art to practice the technology, including making and using any devices or systems and performing any incorporated methods. The patentable scope of the technology is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

The invention claimed is:

1. A tillage implement, comprising:
a main implement frame;
a disk frame supported by the main implement frame;
a plurality of ground-engaging shanks supported by the main implement frame and configured to till soil as the tillage implement traverses a field;
a plurality of disks supported by the disk frame, each disk configured to rotate relative to the soil of the field;
a load sensor configured to generate data indicative of a draft load being applied to the disk frame by the plurality of disks as the tillage implement traverses the field; and
a computing system communicatively coupled to the load sensor, the computing system configured to:
determine a twisting parameter of the disk frame about the main implement frame based on the data generated by the load sensor; and
determine when at least one disk of the plurality of disks is plugged based on the determined twisting parameter.

2. The tillage implement of claim 1, wherein:
the main implement frame defines a centerline extending parallel to a direction of travel of the tillage implement; and
when determining the twisting parameter, the computing system is configured to:
determine the twisting parameter of the disk frame about the centerline of the main implement frame based on the data generated by the load sensor.

3. The tillage implement of claim 2, wherein:
the disk frame is supported by the main implement frame at a plurality of coupling joints, and
the load sensor corresponds to a plurality of load sensors, each load sensor of the plurality of load sensors positioned at one of the coupling joints of the plurality of coupling joints and configured to generate data indicative of the draft load being applied to the disk frame by the plurality of disks at the coupling joint at which the load sensor is positioned.

4. The tillage implement of claim 3, wherein, when determining the twisting parameter about the centerline of the main implement frame, the computing system is configured to:
determine the draft load being applied to the disk frame by the plurality of disks at each coupling joint based on the data generated by the plurality of load sensors;
determine a distance between the centerline of the main implement frame and each load sensor of the plurality of load sensors; and
determine the twisting parameter of the disk frame about the centerline of main implement frame based on the determined draft load being applied to the disk frame by the plurality of disks at each coupling joint and the determined distance.

5. The tillage implement of claim 1, wherein the computing system is configured to:
after determining that the at least one disk of the plurality of disks is plugged, identify a location of the at least one disk of the plurality of disks that is plugged based on the determined twisting parameter.

6. A system for detecting disk plugging on a tillage implement, the system comprising:
a main implement frame;
a disk frame supported by the main implement frame;
a plurality of disks supported by the disk frame, each disk configured to rotate relative to soil of a field;
a load sensor configured to generate data indicative of a draft load being applied to the disk frame by the plurality of disks as the tillage implement traverses the field; and
a computing system communicatively coupled to the load sensor, the computing system configured to:
determine a twisting parameter of the disk frame about the main implement frame based on the data generated by the load sensor; and
determine when at least one disk of the plurality of disks is plugged based on the determined twisting parameter.

7. The system of claim 6, wherein:
the main implement frame defines a centerline extending parallel to a direction of travel of the tillage implement; and
when determining the twisting parameter, the computing system is configured to:
determine the twisting parameter of the disk frame about the centerline of the main implement frame based on the data generated by the load sensor.

8. The system of claim 7, wherein:
the disk frame is supported by the main implement frame at a plurality of coupling joints, and
the load sensor corresponds to a plurality of load sensors, each load sensor of the plurality of load sensors positioned at one of the coupling joints of the plurality of coupling joints and configured to generate data indicative of the draft load being applied to the disk frame by the plurality of disks at the coupling joint at which the load sensor is positioned.

9. The system of claim 8, when determining the twisting parameter about the centerline of the main implement frame, the computing system is configured to:
determine the draft load being applied to the disk frame by the plurality of disks at each coupling joint based on the data generated by the plurality of load sensors;
determine a distance between the centerline of the main implement frame and each load sensor of the plurality of load sensors; and
determine the twisting parameter of the disk frame about the centerline of main implement frame based on the determined draft load being applied to the disk frame by the plurality of disks at each coupling joint and the determined distance.

10. The system of claim 6, wherein the computing system is configured to:
initiate a control action associated with de-plugging the at least one disk of the plurality of disks when determined that the at least one disk of the plurality of disks is plugged.

11. The system of claim 10, wherein the control action comprises notifying an operator of the tillage implement that the at least one disk of the plurality of disks is plugged.

12. The system of claim 10, wherein the control action comprises halting a ground speed of the tillage implement.

13. The system of claim 10, wherein the control action comprises adjusting a position of the plurality of disks relative to the main implement frame.

14. A method for detecting disk plugging on a tillage implement, the tillage implement including a main implement frame and a disk frame supported by the main implement frame at a plurality of coupling joints, the method comprising:

receiving, with a computing system, load sensor data from a load sensor indicative of a draft load being applied to the disk frame by a plurality of disks supported by the disk frame as the tillage implement traverses a field;

determining, with the computing system, a twisting parameter of the disk frame about the main implement frame based on the received load sensor data;

determining, with the computing system, when at least one disk of the plurality of disks is plugged based on the determined twisting parameter; and initiating, with the computing system, a control action associated with de-plugging the at least one disk of the plurality of disks when it is determined that the at least one disk of the plurality of disks is plugged.

15. The method of claim 14, wherein, when determining the twisting parameter, the method comprises:

determining, with the computing system, the twisting parameter of the disk frame about a centerline of the main implement frame extending parallel to a direction of travel of the tillage implement based on the data generated by the load sensor.

16. The method of claim 15, wherein, when determining the twisting parameter about the centerline of the main implement frame, the method comprises:

receiving, with the computing system, load sensor data from a plurality of load sensors indicative of the draft load being applied to the disk frame by the plurality of disks at each coupling joint of the plurality of coupling joints;

determining, with the computing system, the draft load being applied to the disk frame by the plurality of disks at each coupling joint based on the received load sensor data from the plurality of load sensors;

determining, with the computing system, a distance between the centerline of the main implement frame and each load sensor of the plurality of load sensors; and determining, with the computing system, the twisting parameter of the disk frame about the centerline of main implement frame based on the determined draft load being applied to the disk frame by the plurality of disks at each coupling joint and the determined distance.

17. The method of claim 14, wherein, when initiating the control action, the method comprises:

notifying, with the computing system, an operator of the tillage implement that the at least one disk of the plurality of disks is plugged.

18. The method of claim 14, wherein, when initiating the control action, the method comprises:

halting, with the computing system, a ground speed of the tillage implement.

19. The method of claim 14, wherein, when initiating the control action, the method comprises:

adjusting, with the computing system, a position of the plurality of disks relative to the main implement frame.

* * * * *